3,642,754
PROCESS FOR POLYMERIZING FLUORO-OLEFINS
IN THE PRESENCE OF ISOBUTYRYL PEROXIDE
Yutaka Kometani, Nishinomiya-shi, Masayoshi Tatemoto, Takatsuki-shi, Masahiro Okuda, Amagasaki-shi, Chuzo Okuno, Osaka-shi, and Shinsuke Sakata, Shoji Sakai, and Masahiko Oka, Settsu-shi, Japan, assignors to Daikin Kogyo Co., Ltd., Osaka-shi, Japan
No Drawing. Filed Aug. 12, 1968, Ser. No. 751,738
Claims priority, application Japan, Aug. 23, 1967, 42/54,328
Int. Cl. C08f 3/20, 3/22, 3/24
U.S. Cl. 260—92.1                                     6 Claims

ABSTRACT OF THE DISCLOSURE

Process for manufacturing fluoro-olefin polymers by polymerization of fluoro-olefins in the presence of isobutyryl peroxide as a catalyst. The polymerization reaction of the present invention proceeds with a higher polymerization velocity at a lower polymerization temperature to give a polymer of a higher polymerization degree than those polymerizations hitherto known. It is also characterized in the fact that the fluoro-olefin polymers obtained by the present process are superior in the properties to those hitherto produced.

---

This invention relates to a process for manufacturing fluoro-olefin polymers. More particularly, it relates to a process for manufacturing fluoro-olefin polymers by polymerization of fluoro-olefins in the presence of isobutyryl peroxide as a catalyst. The chemical structure of isobutyryl peroxide may be illustrated as follows:

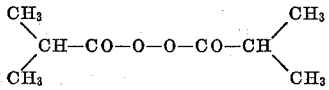

The process of the present invention is particularly advantageous in that the polymerization reaction proceeds with a higher polymerization velocity at a lower polymerization temperature to give a polymer of a higher polymerization degree than those polymerizations hitherto known and that the polymer obtained is superior in the properties to those produced by the methods hitherto known.

For the polymerization of fluoro-olefins, a variety of catalysts have been used, i.e. organic and inorganic peroxides, persulfates, persulfates combined with various reducing agents, and catalyst systems of those peroxides or persulfates and such promoters as heavy metal salts. However, the polymerization reactions by these well known catalysts are accompanied with various disadvantages, i.e. a high polymerization temperature, a high polymerization pressure, a low polymerization velocity, a poor rate of polymerization and a low polymerization degree. For example, in the case of polymerization of vinylidene fluoride, a catalyst system consisting of a persulfate (e.g. potassium persulfate, ammonium persulfate), sodium hydrogen sulfite and ferrous sulfate is known to be excellent in that a high polymerization degree and a high polymerization velocity can be achieved. But, the polymer produced by this catalyst system is disadvantageously discolored with foaming on heat treatment which is necessitated for molding. During molding, crosslinking may occur, which considerably reduces the flexibility of the moldings. On the other hand, although the use of an organic peroxide (e.g. dibenzoyl peroxide, diacetyl peroxide) as a catalyst overcomes such defects in the properties of the molded product, the polymerization reaction by such an organic peroxide requires a high polymerization pressure and the yield of the polymer is low. Likewise, it has been known that the polymerization of trifluorochloroethylene can be effected with a catalyst system consisting of a persulfate, sodium hydrogen sulfite and ferrous sulfate, or with trichloroacetyl peroxide as a catalyst. But, in the case of the former catalyst system, while a high polymerization velocity can be achieved, the stability of the resultant polymer is unsatisfactory. In the case of the latter catalyst, although the resultant polymer is sufficiently stable, the polymerization velocity and the yield of the polymer are quite low and the procedure for recovering the resultant polymer becomes complicated. In any case, the industrial disadvantages are unavoidable.

It has now been discovered that isobutyryl peroxide can induce the polymerization of fluoro-olefins with a high polymerization velocity even at a low temperature to give the objective polymers in a good yield. It has also been discovered that the thus produced polymers are furnished with excellent mechanical strength and heat-resistant property and have no such defects as described above. The present invention has been accomplished on the basis of these discoveries.

A fundamental object of the present invention is to embody a process for manufacturing fluoro-olefin polymers. Another object of the invention is to embody a process for manufacturing fluoro-olefin polymers with a high polymerization velocity. Another object of the invention is to embody a process for manufacturing fluoro-olefin polymers at a low temperature. A further object of the invention is to embody a process for manufacturing mechanically strong and heat-resistant fluoro-olefin polymers. A still further object of the invention is to embody the use of isobutyryl peroxide as a catalyst for polymerization of fluoro-olefins. These and other objects will be apparent to those conversant with the art to which the present invention pertains from the following descriptions.

According to the present invention, the polymerization of a fluoro-olefin to a corresponding fluoro-olefin polymer is carried out in the presence of isobutyryl peroxide as a catalyst.

The starting fluoro-olefin is a polymerizable olefin having at least one fluorine atom. As illustrative of the fluoro-olefin are vinylidene fluoride, vinyl fluoride tetrafluoroethylene, trifluorochloroethylene, hexafluoropropylene and the like. Further, the said olefin fluoride may be a mixture of two or more compounds as illustrated above.

A suitable ratio of the catalyst, isobutyryl peroxide, to the employed monomer is from 0.005 to 5.0% (weight), preferably from 0.01 to 1.0% (weight).

The polymerization condition should be decided in consideration of the activity of the monomer employed and the polymerization degree desired. Generally, the polymerization reaction of the present invention is carried out at from 0 to 80° C., preferably at from 10 to 40° C., under from 0 to 200 kg./cm.² g., preferably under from 0 to 50 kg./cm.² g. In the case where a liquid monomer is used, the polymerization pressure is equal to the vapor pressure of the said monomer at the polymerization temperature.

In the polymerization reaction of the present invention, there may be used water, methanol, ethanol, butanol, trifluorotrichloroethane, tetrafluorodichloroethane or the like as a dispersion medium or a stabilizer of the polymerization system. When the polymerization is carried out in an aqueous medium, there may be supplied, if necessary, a surfactant such as perfluorocarboxylic acids, perchlorofluorocarboxylic acids, their sodium salts or their ammonium salts. Although the polymerization of the present invention can be executed in any form of bulk polymerization, suspension polymerization, emulsion polymerization and solution polymerization, suspension or emulsion polymerization in an aqueous medium is generally preferred from the industrial and economical viewpoints, because the recoveries of the resultant polymer and the unreacted monomer can be easily achieved, the cost of the reaction medium can be economized and the polymerization can be performed much more smoothly.

The process of the present invention is particularly advantageous and also characterized in that the polymerization reaction can be performed at a low temperature. For example, the polymerization of vinylidene fluorine should be carried out at a temperature higher than 100° C. under from 100 to 1000 atmospheric pressure to produce polyvinylidene fluoride of an industrially significant polymerization degree in a sufficient yield as long as hitherto known catalyst is relied upon. Since this polymerization temperature is far higher than the critical temperature of vinylidene fluoride, i.e. 30.1° C., an advantageous liquid phase polymerization such as bulk polymerization, suspension polymerization or emulsion polymerization has been available. Therefore, the polymerization has been effected by compressing the gaseous monomer into the reactor. On the other hand, the process of the present invention may be carried out at a lower temperature, i.e. at from 0 to 80° C., preferably at from 10 to 40° C. Thus, such a form of polymerization as bulk polymerization, suspension polymerization or emulsion polymerization can be advantageously adopted, and the process of the present invention is also superior to the known methods in the polymerization yield as well as the polymerization degree. In addition, the mechanical yield as well as the polymerization degree. In addition, the mechanical and chemical properties of the thus produced polymers are so improved that the molding of the products can be achieved with no substantial difficulties as encountered in the previous art.

These technical progresses have been confirmed in polymerization of other fluoro-olefins, e.g. vinyl fluoride, trifluorochloroethylene, etc.

Although the catalyst of the present invention, isobutyryl peroxide, is explosive, it can safely be handled and preserved as a solution in straight chain hydrocarbons, e.g. n-heptane, and inactive fluorochlorocarbons. Such a stabilized solution of isobutyryl peroxide can be used directly as a catalyst without removal of the solvent.

Practical embodiments of the present invention will be illustrated in the following examples. It should be understood that they are presented for the purpose of illustration only and not of limitation. The abbreviations used have conventional significances unless otherwise noted.

EXAMPLE 1

A 30 liter-reaction vessel of stainless steel equipped with a mechanical stirrer is charged with 15 liters of deionized and deoxygenated water and 14 grams of a 50% n-heptane solution of isobutyryl peroxide, after which the reaction vessel is evacuated and replaced with trifluorochloroethylene and 12 kilograms of trifluorochloroethylene are compressed into the vessel. The vessel is kept at a temperature of about 25° C. under an inner pressure of about 6.5 kg./cm.² g. for 48 hours. Discharging the unreacted gaseous monomer, 3.6 kilograms of polytrifluorochloroethylene are obtained. The efflux velocity is confirmed to be $1.35 \times 10^{-3}$ cm.³/sec. by effluxing from a nozzle of 1 mm. in length and 1 mm. in diameter at 230° C. with a pressure of 100 kg./cm.² g., and the effluxed polymer is completely colorless. The N.S.T. (No Strength Temperature) of the polymer is indicated to be 280° C.

EXAMPLE 2

A 3.0 liter-reaction vessel of stainless steel equipped with a mechanical stirrer is charged with 1.5 liters of deionized and deoxygenated water and 2.5 grams of a 50% n-heptane solution of isobutyryl peroxide, after which the reaction vessel is evacuated and replaced with vinylidene fluoride and 0.8 kilogram of vinylidene fluoride is compressed into the vessel. The vessel is kept at a temperature of about 27° C. under an inner pressure of about 42 kg./cm.² g. for 25 hours. Discharging the unreacted gaseous monomer, 290 grams of polyvinylidene fluoride are obtained. The limiting viscosity number of the polymer obtained is determined at 35° C. in a solution of 0.5 gram of the polymer in 100 milliliters of dimethylacetamide to be 2.47. The efflux velocity is confirmed to be $0.98 \times 10^{-3}$ cm.³/sec. by a similar manner to that described in Example 1 at 220° C. with a pressure of 30 kg./cm.² g.

EXAMPLE 3

A 35 liter-reaction vessel of stainless steel equipped with a mechanical stirrer is charged with 25 liters of deionized and deoxygenated water, 25 grams of a 50% n-heptane solution of isobutyryl peroxide and 10 grams of methyl cellulose (grade 4,000 cp.), after which the reaction vessel is evacuated and replaced with vinylidene fluoride and 6 kilograms of vinylidene fluoride are compressed into the vessel. The vessel is kept at a temperature of about 25° C. under an inner pressure of about 39 kg./cm.² g. for 24 hours. Discharging the unreacted gaseous monomer, 2 kilograms of polyvinylidene fluoride are obtained. The limiting viscosity number of the polymer obtained is determined at 35° C. in a solution of 0.5 g. of the polymer in 100 ml. of dimethylacetamide to be 1.80. The efflux velocity is confirmed to be $4.2 \times 10^{-3}$ cm.³/sec. by a similar manner to that described in Example 1 at 220° C. with a pressure of 30 kg./cm.² g.

EXAMPLE 4

A 3.0 liter-reaction vessel of stainless steel equipped with a mechanical stirrer is charged with 2.0 liters of deionized and deoxygenated water, 2.5 grams of a 50% n-heptane solution of isobutyryl peroxide and 1 gram of finely powdered calcium carbonate, after which the reaction vessel is evacuated and replaced with vinylidene fluoride and 0.6 kilogram of vinylidene fluoride is compressed into the vessel. The vessel is kept at a temperature of about 25° C. under an inner pressure of about 40 kg./cm.² g. for 24 hours. Discharging the unreacted gaseous monomer, 157 grams of polyvinylidene fluoride are obtained. The limiting viscosity number of the polymer obtained is determined at 35° C. in a solution of 0.5 g. of the polymer in 100 ml. of dimethylacetamide to be 1.66. The efflux velocity is confirmed to be $4.6 \times 10^{-3}$ cm.³/sec. by a similar manner to that described in Example 1 at 220° C. with a pressure of 30 kg./cm.² g.

EXAMPLE 5

A 30 liter-reaction vessel of stainless steel equipped with a mechanical stirrer is charged with 15 liters of deionized and deoxygenated water, 20 grams of a 50% n-heptane solution of isobutyryl peroxide and a solution of 2 grams of polyvinyl alcohol (polymerization degree 500) in 100 milliliters of water, after which the reaction vessel is evacuated and replaced with vinyl fluoride and 6 kilograms of vinyl fluoride are compressed into the vessel. The vessel is kept at a temperature of about 25° C. under an inner pressure of about 27 kg./cm.² g. for 14 hours. Discharging the unreacted gaseous monomer, 4.7 kilograms of polyvinyl fluoride are obtained. The polymer is ground with "Jet-O-Mizer" (a grinder manufactured by Fluid Energy Processing Equipments, U.S.A.) into a fine powder (0.1 to 1.5μ). The powder is dispersed in dimethylacetamide and treated with a ball mill for 24 hours to obtain a 30% organosol. Heat treatment of the organosol spread on a plate at 175° C. for 20 minutes gives a transparent film. The limiting viscosity number of the polymer obtained is determined at 100° C. in a solution of 0.5 g. of the polymer in 100 ml. of hexamethyl phosphoramide to be 1.67.

What is claimed is:

1. A process for manufacturing halo-olefine polymers selected from the group consisting of halo-ethylenes and halo-propylenes containing at least one fluoro group therein which comprises substantially polymerizing a polymerizable halo-olefine monomer in the presence of at least 0.005% by weight of isobutyryl peroxide as a catalyst at a temperature of from 0 to 80° C. and under a pressure of from 0 to about 200 kg./cm.$^2$.

2. The process according to claim 1, wherein the polymerizable halo-olefine monomer is selected from the group consisting of vinylidene fluoride, vinyl fluoride tetrafluoroethylene, trifluorochloroethylene and hexafluoropropylene.

3. The process according to claim 1, wherein the polymerization is carried out substantially in an aqueous medium.

4. The process according to claim 1, wherein the polymerization is carried out at a temperature of from 10 to 40° C.

5. The process according to claim 1, wherein the ratio of isobutyryl peroxide against the monomer is from 0.005 to 5.0% (weight).

6. A process for manufacturing fluoro-olefine polymers selected from the group consisting of halo-ethylenes and halo-propylenes which comprises polymerizing a member selected from the group consisting of vinylidene fluoride, vinyl fluoride, tetrafluoroethylene, trifluorochloroethylene and hexafluoropropylene at a temperature from 0 to 80° C. under a pressure of from 0 to 200 kg./cm.$^2$ g. in an aqueous medium in the presence of at least 0.005% by weight of isobutyryl peroxide as a catalyst at a temperature of from 10 to 40° C. and under a pressure of from 0 to about 200 kg./cm.$^2$.

References Cited
UNITED STATES PATENTS 2,394,243   2/1946   Joyce _____ 260—92.1
2,531,134   11/1950  Kropa et al. _____ 260—92.1

HARRY WONG, JR., Primary Examiner

U.S. Cl. X.R.
260—30.6, 32.6